United States Patent [19]

Gregory, Sr.

[11] Patent Number: 4,734,743

[45] Date of Patent: Mar. 29, 1988

[54] LIGHT TIGHT SLIDABLE TRANSPORT FOR TRANSFERRING LIGHT SENSITIVE MATERIALS

[75] Inventor: Edward G. Gregory, Sr., Reston, Va.

[73] Assignee: LogEtronics, Inc., Springfield, Va.

[21] Appl. No.: 38,373

[22] Filed: Apr. 15, 1987

[51] Int. Cl.[4] ...................... G03B 27/30; G03B 27/32; G03B 27/52

[52] U.S. Cl. ...................................... 355/27; 355/100; 355/106

[58] Field of Search ................... 355/27, 28, 100, 106, 355/14 SH, 3 SH; 354/312, 319

[56] References Cited

U.S. PATENT DOCUMENTS 3,684,372 8/1972 Limberger ........................ 355/27 X
4,281,922 8/1981 Matsumoto ..................... 355/100 X
4,586,810 5/1986 Landa ............................ 355/106 X
4,636,061 1/1987 Staude et al. ..................... 355/27 X

*Primary Examiner*—Richard A. Wintercorn
*Attorney, Agent, or Firm*—Pollock, Vande Sande & Priddy

[57] ABSTRACT

A material transport for conveying photographic materials in a light tight environment from a typesetter to a material processor. The transport is supported in a shroud which is connected to the processor by a pair of slides. The transporter includes at a delivery end a gasket member in compression with a material receiving slot in the processor. The transporter is supported along an axis adjacent said processor for pivotal movement to a service position. The shroud and transporter are thereby slidable to a service position, permitting access to one side of a typesetter.

4 Claims, 11 Drawing Figures

FIG. 1
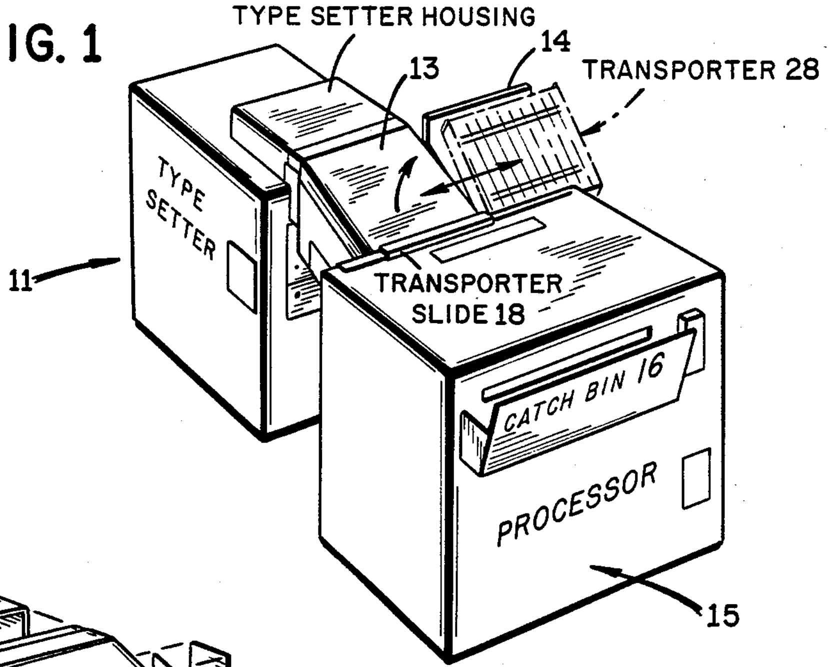
FIG. 2
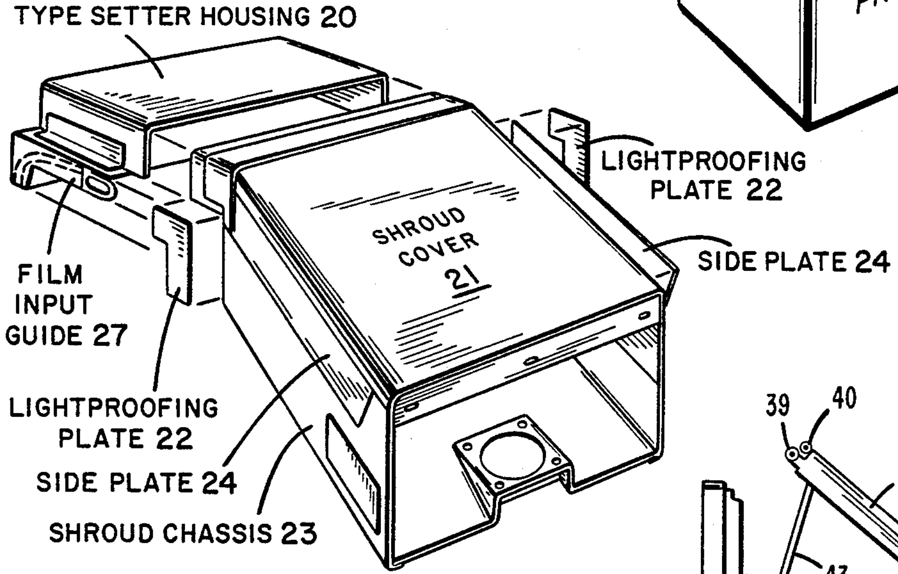
FIG. 4
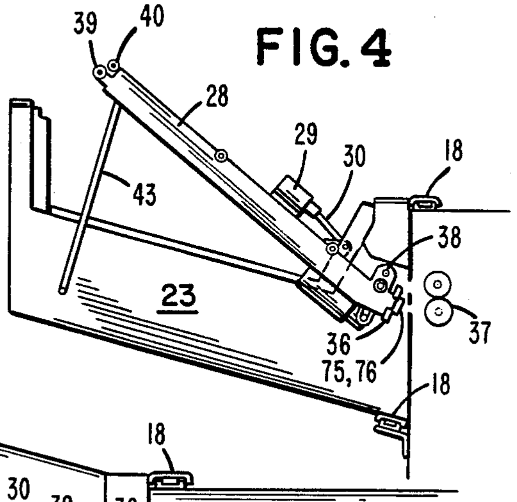
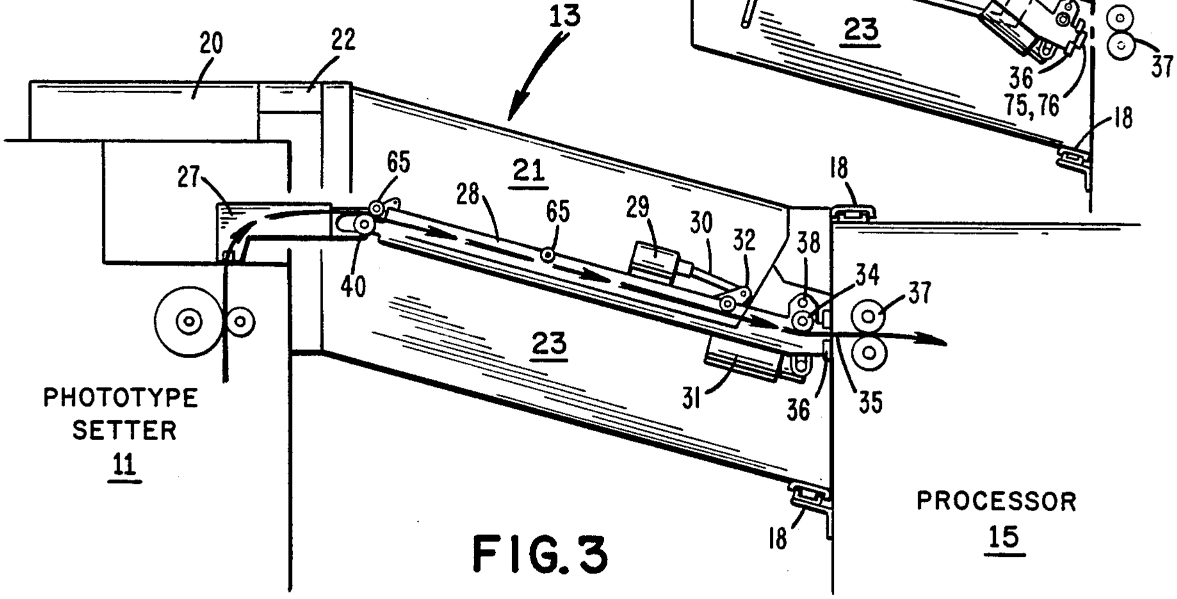
FIG. 3

LIGHT TIGHT SLIDABLE TRANSPORT FOR TRANSFERRING LIGHT SENSITIVE MATERIALS

The present application relates to the automatic photographic film processing art. Specifically, an apparatus for conveying exposed photographic materials in a light tight environment to an automatic film processor is described.

Print media typesetters are used throughout the printing industry to compose so called "cold type" by selectively exposing a photographic medium, such as paper or film, with the images of different type fonts. The photographic medium is stored in the typesetter in large rolls of 35–40 pounds of material having a photographic emulsion suitable for forming images when exposed to a masked light source. These rolls of photographic material are loaded in an entryway of the typesetter which is usually on the same side of the typesetter as the exit slot from which exposed and cut sheets of photographic material are delivered to a light tight storage cassette. The storage cassette may be manually carried from the typesetter and its contents may be removed in a darkroom for further processing.

Recently, attempts have been made to include automatic transport apparatus for conveying the exposed sheets directly to a film processor in a light tight environment where the film sheets can be developed, fixed, washed and dried to create a final print. The assignee of the present application makes such transports. These transports comprise a conveyor in a light tight housing which is fixed in a semi-permanent installation which links the exit slot of the typesetter with the entrance slot of a film processor. The conveyor is maintained in a light tight shroud during material transport to the film processor.

The difficulty with such transports is that they necessarily occupy a position on the same side of the typesetter as the loading bin for the photographic material. Thus, the operator must insert a 30–40 pound roll of photographic material underneath the transporter in the material entryway. The transporter itself must be held in substantially rigid alignment between the typesetter and film processor to permit transport of the cut film sheets from the typesetter exit slot to the entrance slot on the processor. Thus, it is not convenient to remove the transporter, which itself may weigh 50–100 pounds, in order to access the material entryway on the typesetter.

SUMMARY OF THE INVENTION

It is an object of this invention to provide a transporter which is readily movable between an operating position and a servicing position.

It is a more specific object of this invention to provide a light tight transporter between a typesetter and film material processor which will improve access to the typesetter to expedite loading of new photographic film materials.

These and other objects of the invention are accomplished by a shroud member which supports a material transporter connected at one end to a film processor. The shroud member is connected by a pair of slides, to slide parallel to the axis of a photograph material receiving slot in the processor, between a service position adjacent the photographic material receiving slot and an operating position in alignment with the receiving slot.

The material transporter having a material delivery end is supported in the shroud member on a hook member to permit vertical tilting of the transporter. In an operational material transport condition, a gasket member disposed about the material transporter delivery end is compressed between the delivery end and the periphery of the material receiving slot of the processor. The material transporter has a material receiving end positioned to receive cut sheets of exposed photographic material from the typesetter and conveys the sheets to the delivery end.

The shroud includes a bottom, top and sides for sealing the transporter against room light. The gasket member disposed about the material transporter delivery end maintains a light tight seal around the processor entrance slot, avoiding any inadvertent exposure of film materials entering the receiving slot.

During a loading of photographic material in the typesetter, the material transporter can be tilted about the supporting hook, deflecting the material delivery end away from the receiving slot of the processor. The shroud member supporting the material transporter is thereby free to slide parallel to the slot to a service position, permitting entry and access to the typesetter material entryway.

DESCRIPTION OF THE FIGURES

FIG. 1 demonstrates the slidable transport of a preferred embodiment of the invention coupled to the typesetter and film processor.

FIG. 2 is a detailed isometric view of the shroud for the transporter and its relationship to the typesetter housing.

FIG. 3 is a schematic representation showing the transporter in its operational position with respect to the processor and phototypesetter.

FIG. 4 shows the transport in its service position with respect to the film processor.

FIG. 7 is a side view of the transporter 28 and the respective gasket seal with the film processor.

FIG. 10 is a further view of the alignment between the transporter 28 and processor 15.

FIG. 11 is a side view of the gasket 36 and transporter frame 72.

DESCRIPTION OF THE PREFERRED EMBODIMENT

Figure 6:
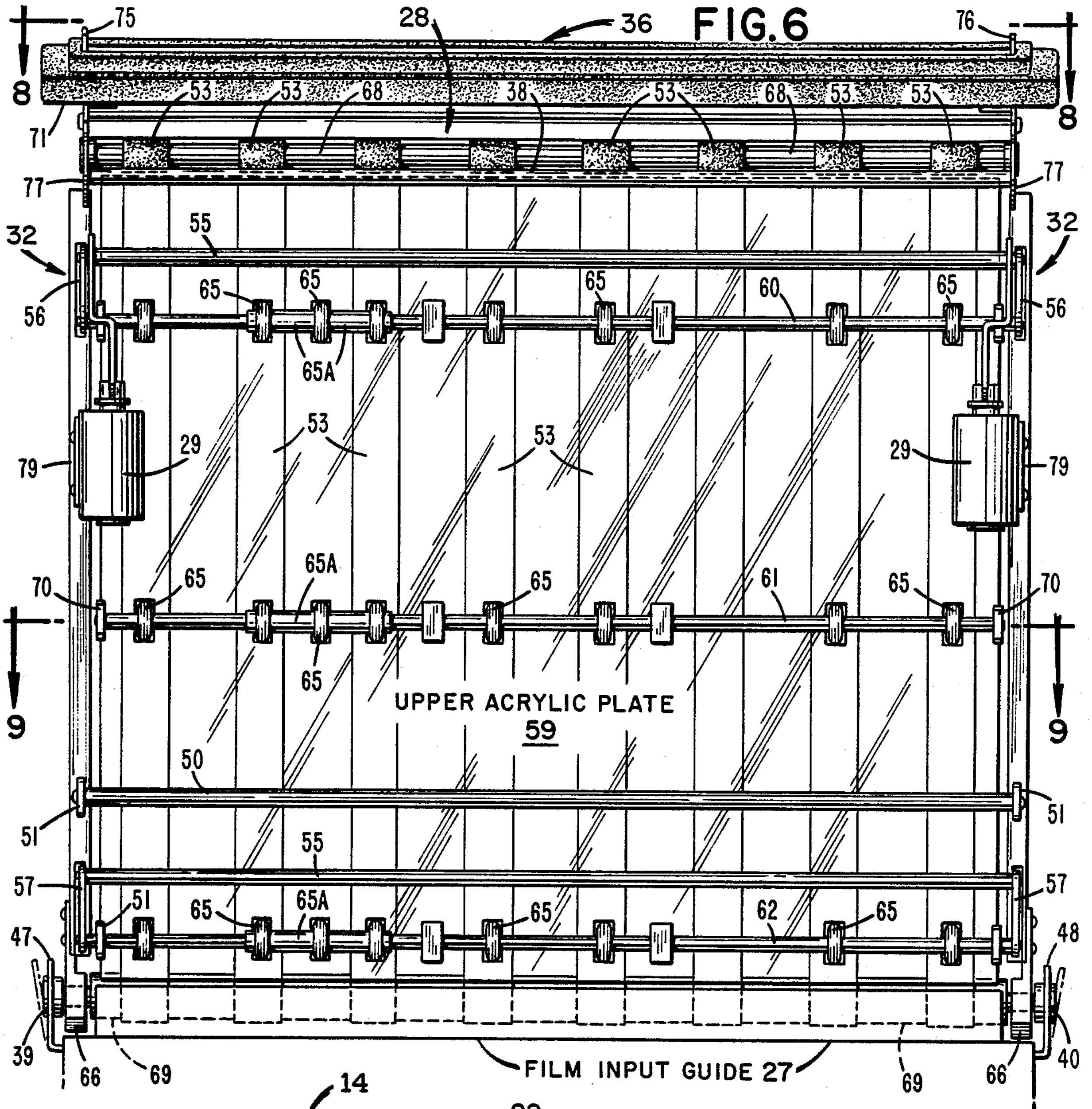
FIG. 6 is a top view of the transport 28 and its relationship to the typesetter.

Referring now to FIG. 1, there is shown an assembly of a phototypesetter 11, film processor 15 and transporter housing 13. The phototypesetter 11 exposes portions of a roll of photosensitive material to form images of print characters. The print characters are generated from data applied to the typesetter. Images of the type font are formed on a section of material from the roll of photosensitive material.

The exposed sheet material is cut into individual sheets of a standard length and conveyed through an exit aperture of the typesetter to the interior of transporter housing 13. The cut exposed photographic film sheets are transported to an entrance slot on the film processor 15. The film processor 15 will develop, fix, wash and dry the exposed film sheets into prints which are delivered to a catch bin 16.

In the embodiment in accordance with FIG. 1, the transporter 28 is supported in a housing 13, shown in FIG. 1, which includes a shroud cover 21 (FIG. 2), sides 24 and a bottom comprising the shroud chassis 23, providing a light tight environment for the transporter 28. The shroud chassis 23 and transporter 28 are supported to the processor 15 by slides 18 to permit movement from an operating positions, shown in FIG. 1, to a service position (FIG. 4). Thus, during loading of the typesetter 11 it is possible to access the side of the typesetter which includes the film exit slot as well as an entryway for a roll of photographic film material. The slidable shroud and associated transporter in the service position permits the operator of the typesetter to insert large heavy rolls of light sensitive material in the phototypesetter. The handling of the bulky photographic materials is facilitated by movement of the shroud chassis 23 and transporter 28 to its service position which does not require any major disassembly. Greater convenience and an overall productivity improvement results for the personnel operating the system.

Shown in FIG. 2 is the shroud cover 21, and shroud chassis 23 which supports the material transporter 28. The shroud chassis 23 is supported by a pair of slides 18 (FIG. 3) to the processor 15. The remaining end of the shroud abuts the typesetter housing. A detachable film input guide 27 aligns the free end of the transporter with the exit path at the typesetter. A pair of side plates 22 and a pair of side plates 24 form a light tight enclosure with the shroud cover 21 and shroud chassis 23.

The shroud cover 21, shroud chassis 23 and transporter 28 are shown in the material feed position in FIG. 3. The entrance slot 35 to the processor 15 is sealed by a gasket 36 connected to the material delivery end of the transporter 28. A pair of pick-up rollers 37 receive the cut exposed sheets from the transporter 28, conveying the same into the processor for execution of the first processing step.

The transporter 28 generally comprises a plurality of belts supported over two end rollers. A solenoid 29 connected to a link 30 operates a camming mechanism 32 to being the sheet materials into contact with the plurality of belts on the transporter 28. Roller 34 is an exit guide roller for guiding the delivered material to the entrance slot 35.

The transporter 28 is supported at one end by a rod 38 received in a hook integral with the shroud chassis 23, and at the other end by two bosses 39 and 40 on opposite sides of the transporter 28 received in the film guide 27. The rod 38 permits rotation about the supporting hooks on the shroud 23, such that when bosses 39 and 40 are free from the flexible film guide 27 supports, the entire transporter 28 will rotate about the axis of rod 38.

Referring to FIG. 4, the rotation of transporter 28 about the rod 38 to its tilted service position is shown. With the cover 21 and side plates 24 removed, the operator may free the flexible ends of film guide 27 from bosses 39 and 40 and raise the material receiving end of transporter 28, thus pivoting the transporter 28 about the hook supported rod 38. A supporting rod 43 is used to maintain the transporter 28 in the tilted position. Tilting of the transporter 28 moves gasket 36 and the delivery end of the transporter 28 away from the entrance slot of the processor 15.

With the transporter 28 tilted as shown in FIG. 4, it is possible to release a lock 41 (FIG. 5) such that the entire shroud chassis 23 with transporter will slide linearly along slides 18 in a direction parallel to the material receiving slot 35.

Referring again to FIG. 5, the service position of the shroud chassis 23 and tilted transport 28 is shown when lock 41 is released from pin 52 connected to the shroud chassis 23. The slides 18 permit shroud chassis 23 to be moved to the service position, exposing the entrance slot 35 as well as a baffle 42 surrounding the entrance slot 35.

Adjacent the entrance slot 35 are two aligning slots 44 and 45. These aligning slots receive two aligning tabs shown as 75, 76 on FIG. 4, such that when the shroud 23 is placed in its operable position, the transporter 28 is tilted, aligning tabs 75, 76 are received in the aligning slots 44 and 45. These tabs 75, 76 maintain a rigid horizontal alignment between the transporter and the processor. The gasket 36 will then be compressed as shown in FIG. 3.

Figure 5:
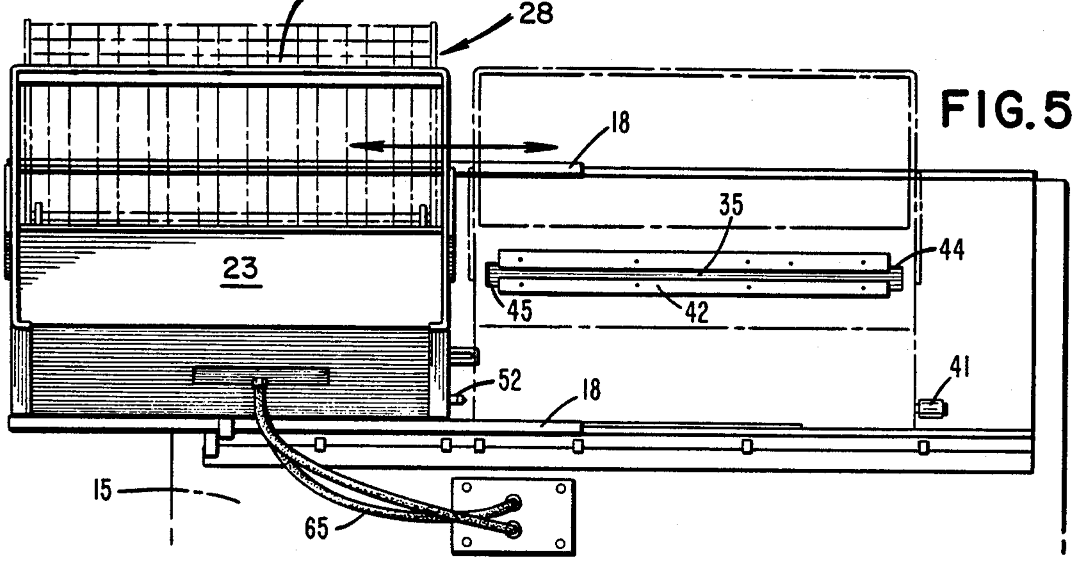
FIG. 5 is a view of the film processor entrance slot with respect to the slidable transporter.

FIG. 5 also demonstrates the electrical cabling 65 connecting the transporter to the film processor 15. Thus, under control from signals from processor 15, the transporter will either be in an idle mode or in a material feed mode. Cabling 65 may also, of course, supply power to peripheral environmental control devices such as a fan or heater, to control humidity within the shroud chassis 23.

FIG. 6 is a top view of the transporter in greater detail detail. The two bosses 39 and 40 are shown in their supported position with respect to the alignment fingers 47 and 48 which are an integral part of film input guide 27. The bosses 39, 40 and alignment fingers 47, 48 position the transporter receiving end with respect to a delivery slot in the typesetter. As depicted in FIG. 6, flexible alignment fingers 47 and 48 may be sprung to a position, released from the bosses 39 and 40 such that the entire transporter 28 may be elevated about a supporting rod 38. A handle 50 facilitates the rotation of the transporter about the axis defined by rod 38, to reach the transporter service position.

A plurality of belts 53 are shown which are driven in a direction to convey film materials from the film input guide of the typesetter to the opposite material delivery end where the film processor 15 receives the transported materials. A pair of solenoids 29 will operate to move an upper acrylic plate 59 downwardly, via two pairs of cam members 56 and 57 for camming mechanism 32 (FIG. 7), pivoting on axle members 60 and 62. Upper acrylic plate 59 includes three axle members 60, 61 and 62, supporting a plurality of freely rotatable wheels 65. When the typesetter 11 has fed the edge of the material into the transporter entrance slot to a preprogrammed position and stops the feed of the material, solenoids 29 will be energized. When the upper acrylic plate 59 is moved downward by the operation of solenoids 29, material which has been fed from the film input guide of the typesetter will have entered edgewise between the upper acrylic plate 59 and the plurality of movable belts 53. The downward motion of the upper acrylic plate 59 will have brought roller 65 into contact with the sheet material. The typesetter will then cut the sheet material.

If several adjacent rollers 65 are coupled on a common hub, as shown in 65*a*, coaxial with the supporting rod 61, the force exerted on the material conveyed along the belts 53 will provide for improved track of the sheet material along a desired linear path in the direction of the processor entrance slot 35.

The motor driven roller 68 supports one end of the belts 53. The remaining end of the belts is supported on a freely rotating roller 69. Thus, operating solenoids 29 will lower the upper acrylic plate 59 bringing the rotatable drive wheels 65 into contact with the material. The material, when forced into contact with belts 53, will be transported to the delivery end of the transporter which is terminated in gasket 36.

Figure 9:
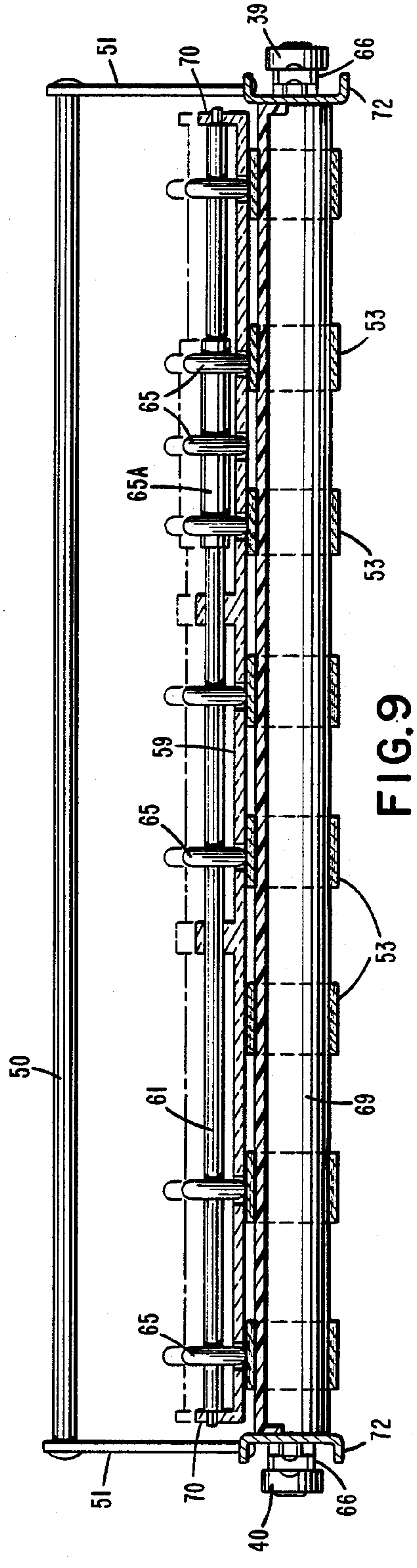
FIG. 9 is a section view of the transporter showing the roller assembly for contacting the transporter belts.

FIG. 9 depicts a section view of the transporter 28, demonstrating how each of the axles 61 and the associated drive wheels 65 are brought into contact with the belts 53. Each axle 61 is supported at an end thereof by a flange 70 on the acrylic plate 59. The transporter 28 has a frame 72 which supports the rollers 68, 69 for the belt drive, as well as the handle 50 for raising and lowering the material receiving end of the transport.

Figure 8:
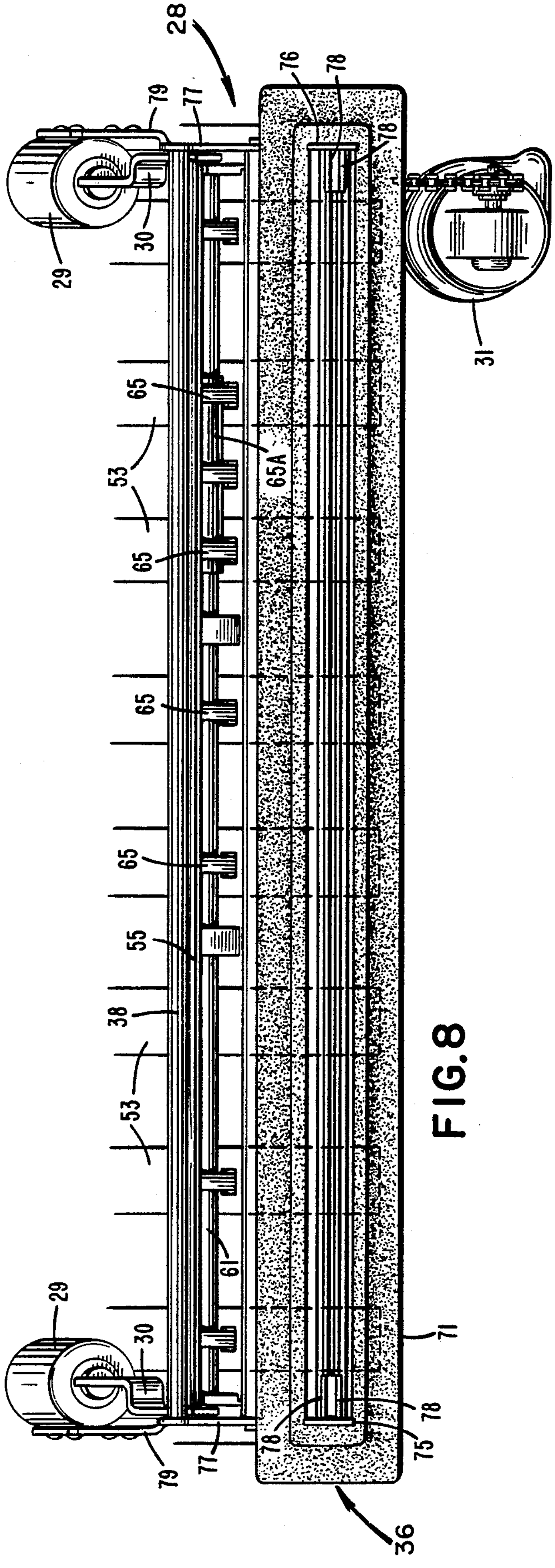
FIG. 8 is a front view of the delivery end of the transporter 28.

The material delivery end of the transporter is shown more specifically in FIG. 8. As an extension of the frame 72, two vertical aligning tabs 76 are provided. The aligning tabs 76 are located one at each end of a delivery slot defined by plastic guides 78 for the materials conveyed by the transporter. The materials will exit from the transporter through the two plastic guides 78, which face the slot 35 in the film processor. The aligning tabs 75 and 76 are received in the aligning slots 44, 45 of FIG. 5, also shown in FIG. 10, thus accurately positioning the discharge end of the transport 28 with the slot 35.

Referring to FIG. 11, the gasket 36 and frame 71 are shown in greater detail. The gasket material 36 is shown bordering the aligning tabs 75 and 76 defining a rectangular aperture for the delivery end of the transporter. The gasket 36 is supported on a frame 71, held in place over each of the aligning tabs 75 and 76 by a spring 84. Positioning is aided by cutouts 81, 82 on aligning tabs 75, 76. Thus, as shown in FIG. 7, when the tabs 75 and 76 engage the aligning slots 44 and 45, compression of the gasket 36 occurs against the baffle 42 of the film processor of FIG. 5. Thus, the baffle 42 and gasket material 36 prohibit light from entering the film processor when correctly positioned.

Referring specifically to FIG. 7, there is shown the transporter 28 in its operational position and in phantom in the service position. The transporter 28 in its operational mode is aligned at one end by the film guide 27 and at the other end by its associated alignment tabs 75, 76.

The frame of the transporter 72 includes a leg 77 on each side of the frame 72. A supporting rod 38 is connected between each of the legs 77 and is held by a hook 73 which is fastened to the shroud chassis 23. Upon freeing of each of the bosses 39 and 40 from the respective flexible guides 47 and 48, and after removal of film guide 27, the entire unit may be tilted upwards about the axis of supporting rod 38 as shown in phantom in FIG. 7.

During the pivoting of the transport 28, the aligning tabs 75 and 76 are pivoted out of the respective aligning slots 44 and 45. Additionally, the gasket 36 with its support 71 is withdrawn but maintained connected to the frame 72 by virtue of spring 84. The entire shroud 23 is therefore free to slide along slides 18 to a service position, permitting access to the typesetter.

The light seal in the operating position is obtained by the gasket 36 compressed against the baffle 42 of the film processor. The gasket material may be a polyurethane foam material, resistant to abrasion which would otherwise contaminate the film materials passing into the film processor. The gasket material is supported on an aluminum frame 71, surrounding the aligning tabs 75 and 76. Each time the transporter 28 is lowered into the operating position, compression of gasket 36 against baffle 42 occurs, sealing the entrance 35 against any incident light. As the force against the gasket 36 is essentially normal to the baffle, the gasket 36 compresses without any motion which would produce abrasion.

Thus, there has been described with respect to one embodiment an example of a light tight slidable transport which is equipped with a light tight seal to prevent stray light from entering the processor. The transporter is quickly aligned in an operable mode and easily moved to a service position to permit access to the side of the typesetter which contains the photographic material feed of exposed media. Those skilled in the art will recognize yet other embodiments described by the claims which follow.

What is claimed is:

1. In a system for processing photographic images, wherein light-sensitive photographic materials are selectively exposed to form an image, and said exposed materials are processed to form a print of said image, an apparatus for conveying said exposed materials in a light tight environment to a photographic material processor comprising:

a shroud member having a bottom, top and first and second open ends, said shroud member supported at one of said open ends to said processor for linear movement parallel to the axis of a photographic material receiving slot;

a material transporter having a material receiving end disposed to receive said exposed photographic materials, and a delivery end to convey said materials to a receiving slot of said print processor said transporter delivery end supported in said shroud for pivotal movement about an axis adjacent said processor, whereby said material transporter delivery end may be tilted from a material delivery position away from said slot when said shroud top is removed; and a gasket member disposed about said material transporter delivery end, connected to tilt with said transporter, said gasket member being compressed against the periphery of said material receiving slot when said transporter is in said delivery position and said gasket being tilted away from said slot when said transporter is in said service position, permitting said shroud and transporter to be slid away from said material receiving slot.

2. The apparatus of claim 1 further comprising a handle fixed to said transporter adjacent said transporter material receiving end, for raising said receiving end vertically, and means for supporting said transporter in an inclined raised position whereby said gasket member is maintained away from said material receiving slot.

3. The apparatus of claim 2 wherein said material transporter includes first and second bosses on opposite sides of said transporter receiving end, adapted to be received in a pair of alignment fingers on an input guide for aligning said transporter receiving end with a material delivery end of a typesetter.

4. The apparatus of claim 3 further comprising a pair of spaced apart positioning tabs on said transporter delivery end for engaging aligning slots in said processor when said material transport is positioned for material delivery, said aligning tabs being pivoted out of said slots when said transporter is raised to said service position.

* * * * *